US012625335B2

(12) United States Patent
Rubinstein et al.

(10) Patent No.: US 12,625,335 B2
(45) Date of Patent: May 12, 2026

(54) OPTICAL INTERPOSERS

(71) Applicant: Mellanox Technologies, Ltd., Yokneam (IL)

(72) Inventors: Alon Rubinstein, Kfar-Yona (IL); Elad Mentovich, Tel Aviv (IL); Dimitrios Kalavrouziotis, Papagou (GR); Paraskevas Bakopoulos, Ilion (GR)

(73) Assignee: Mellanox Technologies, Ltd., Yokneam (IL)

( * ) Notice: Subject to any disclaimer, the term of this patent is extended or adjusted under 35 U.S.C. 154(b) by 637 days.

(21) Appl. No.: 17/631,655

(22) PCT Filed: Aug. 21, 2019

(86) PCT No.: PCT/GR2019/000058
§ 371 (c)(1),
(2) Date: Jan. 31, 2022

(87) PCT Pub. No.: WO2021/033000
PCT Pub. Date: Feb. 25, 2021

(65) Prior Publication Data
US 2022/0276455 A1     Sep. 1, 2022

(51) Int. Cl.
*G02B 6/43*          (2006.01)
*G02B 6/42*          (2006.01)

(52) U.S. Cl.
CPC ............. *G02B 6/43* (2013.01); *G02B 6/4206* (2013.01); *G02B 6/4237* (2013.01)

(58) Field of Classification Search
CPC ...... G02B 6/43; G02B 6/4206; G02B 6/4237; G02B 6/12007; G02B 6/2813;
(Continued)

(56) References Cited

U.S. PATENT DOCUMENTS

| | | | |
|---|---|---|---|
| 5,179,604 A | | 1/1993 | Yanagawa et al. |
| 5,226,100 A | * | 7/1993 | Maerz ................ G02B 6/12011 |
| | | | 359/569 |

(Continued)

FOREIGN PATENT DOCUMENTS

| | | |
|---|---|---|
| WO | WO 2016/107769 A1 | 7/2016 |
| WO | WO 2017/005168 A1 | 1/2017 |

OTHER PUBLICATIONS

International Search Report and Written Opinion from International Patent Application No. PCT/GR2019/000058, dated Aug. 21, 2019, 11 pages.
(Continued)

*Primary Examiner* — Michael P Mooney
(74) *Attorney, Agent, or Firm* — Moore & Van Allen PLLC; Michael M. McCraw

(57)          ABSTRACT

Apparatuses, systems, and associated methods of manufacturing are described that provide an optical interposer and associated communication system. An example optical interposer includes a substrate having a first end that receives a first optical fiber welded thereto and a second end that receives a plurality of photonic integrated circuits (PICs) attached thereto. The interposer further includes an optical waveguide network defined by the substrate that provides optical communication between the first welded optical fiber and the plurality of PICs. The optical waveguide network also includes optical redistribution elements supported by the substrate. In an operational configuration, the optical interposer receives a first input optical signal from the first welded optical fiber, and the plurality of optical redistribution elements successively split the first input optical signal such that a plurality of output optical signals is directed to the plurality of PICs.

23 Claims, 7 Drawing Sheets

(58) Field of Classification Search
CPC .... G02B 6/12004; G02B 6/125; G02B 6/122;
G02B 2006/1215; G02B 2006/12164
See application file for complete search history.

(56) References Cited

U.S. PATENT DOCUMENTS

| | | | |
|---|---|---|---|
| 2017/0010414 A1* | 1/2017 | Dumais | G02B 6/34 |
| 2020/0166328 A1* | 5/2020 | Zhou | A61B 5/0066 |

OTHER PUBLICATIONS

Lars Brusberg et al.; "Single-Mode Glass Waveguide Platform for DWDM Chip-To-Chip Interconnects"; Electronic Components and Technology Conference (ECTC), 2012 IEEE 62nd, IEEE, May 29, 2012 (May 29, 2012), pp. 1532-1539; XP032210792.

* cited by examiner

700

PROVIDE A SUBSTRATE — 702

DEFINE AN OPTICAL WAVEGUIDE NETWORK IN THE SUBSTRATE — 704

SUPPORT A PLURALITY OF OPTICAL REDISTRIBUTION ELEMENTS WITHIN THE OPTICAL WAVEGUIDE NETWORK — 706

OPTICAL INTERPOSERS

CROSS-REFERENCE TO RELATED APPLICATIONS

This application is a national phase entry of International Application No. PCT/GR2019/000058, filed Aug. 21, 2019, the entire contents of which are incorporated herein by reference.

TECHNOLOGICAL FIELD

Example embodiments of the present invention relate generally to network connection systems and, more particularly, to systems and apparatuses for high powered optical signals.

BACKGROUND

Datacenters and other networking systems may include connections between switch systems, servers, racks, and devices in order to provide for signal transmission between one or more of these elements. These connections may be made using cables, transceivers, interconnects, interposers, and connector assemblies. For high bandwidth applications and/or connections over long distances, high powered optical communications may be preferred to ensure signal transmission integrity.

BRIEF SUMMARY

Example embodiments of the present disclosure provide for optical interposers for high powered optical signals. An example optical interposer may include a substrate defining a first end that receives a first optical fiber welded thereto, and a second end that receives a plurality of photonic integrated circuits (PICs) attached thereto. The optical interposer may further include an optical waveguide network defined by the substrate. In an operational configuration in which the first end receives the first welded optical fiber and the second end receives the plurality of PICs, the optical waveguide network may provide optical communication between the first welded optical fiber and the plurality of PICs. The optical interposer may further include a plurality of optical redistribution elements supported by the substrate and disposed within the optical waveguide network. In the operational configuration, the optical interposer may receive a first input optical signal from the first welded optical fiber, and the plurality of optical redistribution elements may successively split the first input optical signal such that a plurality of output optical signals is directed to the plurality of PICs.

In some embodiments, the first end may be configured to receive the first welded optical fiber in an in-plane configuration.

In other embodiments, the first end may be configured to receive the first welded optical fiber in a vertical configuration such that the first welded optical fiber is positioned substantially perpendicular with respect to the substrate.

In some embodiments, the first end of the substrate may be further configured to receive a second optical fiber welded thereto. In such an embodiment, the optical waveguide network may further include a directional coupler configured to receive the first optical input signal from the first welded optical fiber and a second optical input signal from the second welded optical fiber.

In some embodiments, the substrate may further define one or more demultiplexing structures configured to, in an instance in which the first input optical signal includes a multiplexed optical signal, demultiplex the multiplexed optical signal.

In some cases, the optical waveguide network may further include one or more gain input elements configured to provide optical gain to the plurality of output optical signals.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As discussed herein, the example embodiment is illustrated and described with reference to operation with networking cable connections (e.g., a Quad Small Form-factor Pluggable (QSFP)). The embodiments of the present disclosure, however, may be equally applicable for use with any networking cable and associated connector (e.g., Small Form Pluggable (SFP), C-Form-factor Pluggable (CFP), and the like) of any type. Moreover, the embodiments of the present invention may also be used with any cable or interconnect utilized by datacenter racks and associated switch modules (e.g., an active optical module (AOM), QSFP transceiver module, a co-packaged transceiver application-specific integrated circuit (ASIC) multi-chip module (MCM), or the like).

Figure 1:
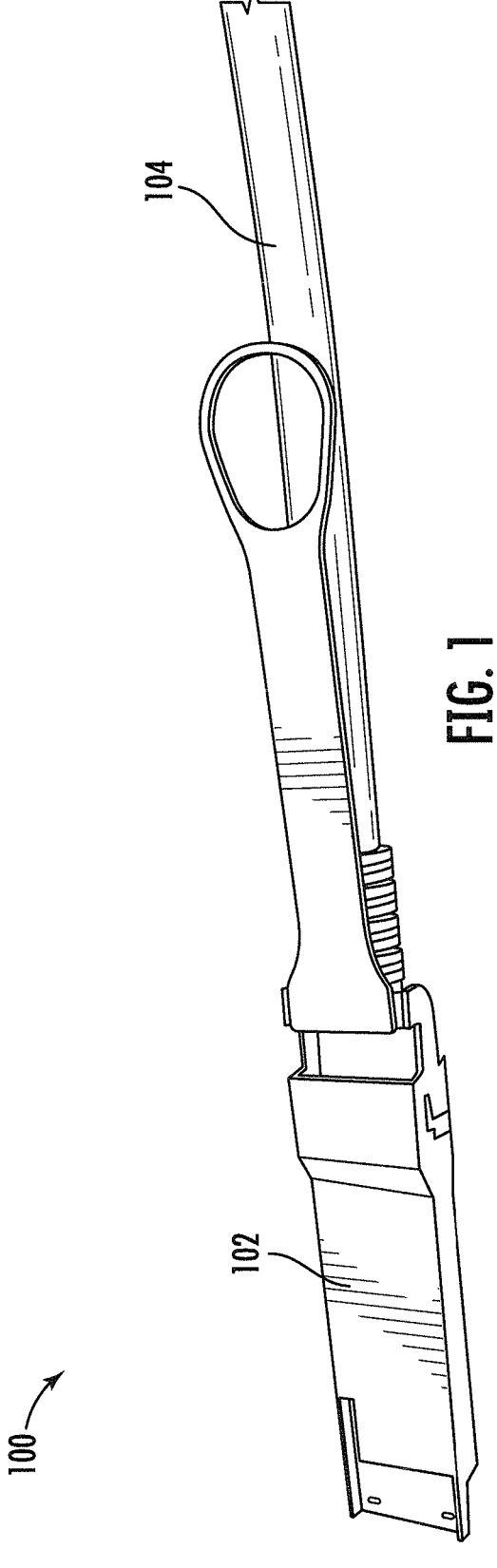
FIG. 1 is a perspective view of a networking cable for implementing some example embodiments described herein.

With reference to FIG. 1, a networking cable 100 is illustrated for use with some embodiments of the present invention. The networking cable 100 may include a cable connector 102 that defines or otherwise supports an optical interposer of the present disclosure. As shown, the cable connector 102 may be configured to connect to, mate with, or otherwise be received by a networking box, datacenter rack, or other networking environment component. The networking cable 100 may include an optical cable 104 (e.g., one or more optical fibers) configured to allow transmission of optical signals between the cable connector 102 and one or more other cable connectors (not shown) in optical communication with the cable connector 102 (e.g., opposite the cable connector 102). By way of example, the networking cable 100 may receive one or more optical signals from the optical cable 104 (e.g., a high-powered or high bandwidth optical fibers) communicably coupled with the cable connector 102. The cable connector 102, via the components of the optical interposer described hereafter, may direct these optical signals for transmission to a networking box (not shown) that receives the cable connector 102.

As described above, for connections over long distances, optical fibers may be used in networking systems in order to ensure proper signal transmission (e.g., with reduced signal degradation). In order to supply optical signals to the numerous connectors within, for example, a datacenter rack, conventional systems employ several optical signal sources, each allocated to a different communication link (e.g., optical transmitter, optical fiber, optical receiver, etc.). As would be evident to one of ordinary skill in the art in light of the present disclosure, including additional optical components may operate to substantially increase the cost, power usage, potential points of failure, etc. associated with conventional connections. In order to reduce the cost associated with such connections, embodiments of the present disclosure as described hereafter may share light generated by an optical source with multiple links. Traditional attempts to connect fiber-coupled optical signal sources with associated networking components have further relied upon adhesive materials to secure the connection between these devices. As communication systems become focused on increasing bandwidth of these optical connections and increasing the number of communication links, however, the required optical power delivered to the networking system is substantial such that traditional adhesives attachments have proven inadequate for use with high-powered (e.g., high power density, bandwidth, etc.) connections, as these signals operate to damage the adhesive materials. As described hereafter, embodiments of the present application utilize emerging optical interposer configurations that leverage optical fibers attached via welded connections in order to couple a single high-power laser source (e.g., optical signal generator) with the same optical interposer. In this way, the optical interposers of the present application further provide for efficient optical signal redistribution from a single optical signal source to a plurality of attached circuits (photonic integrated circuits (PICs)).

Optical Interposer and Communication System

Figure 2:
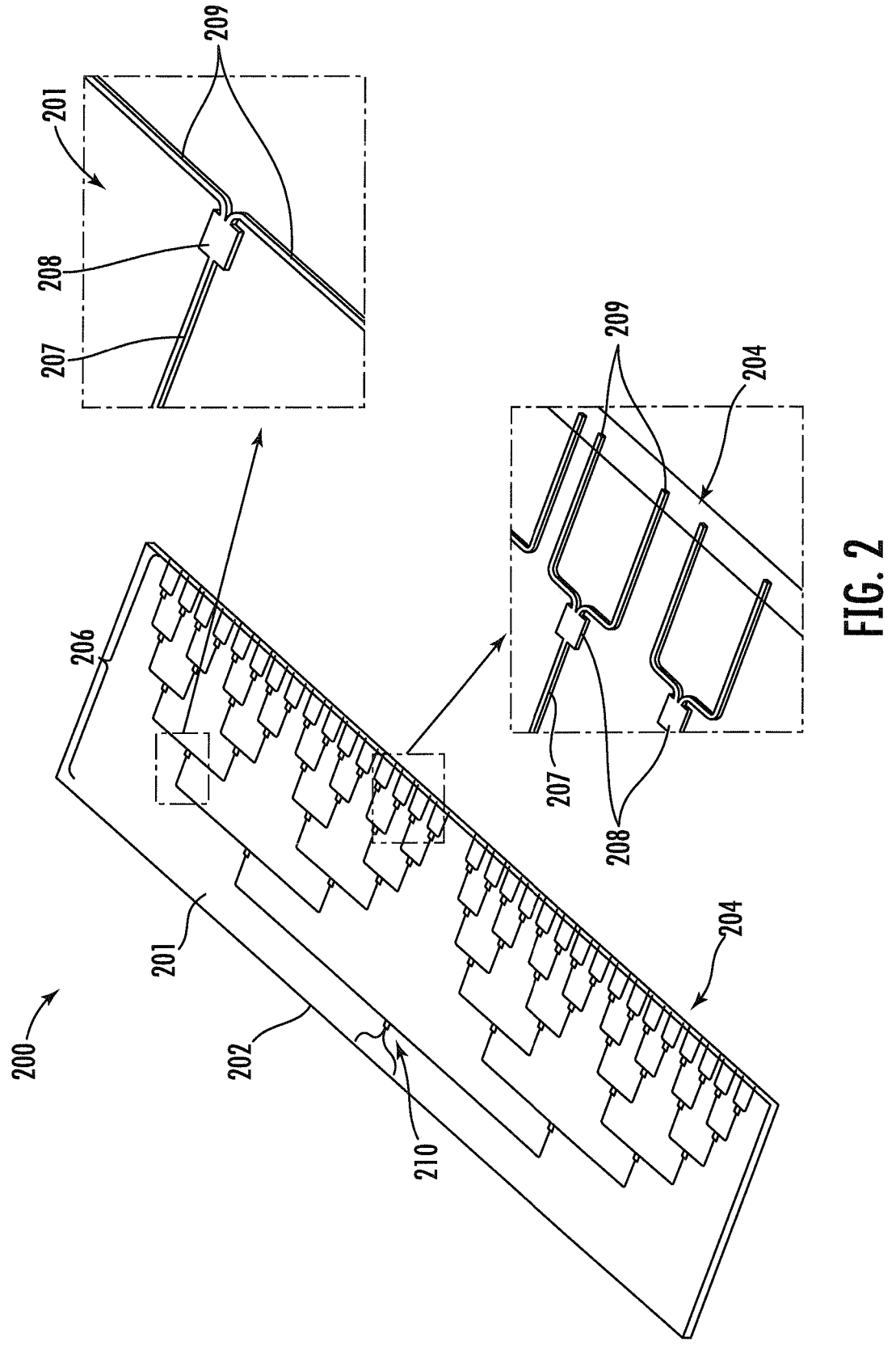
FIG. 2 is a perspective view of an optical interposer according to an example embodiment.

With reference to FIG. 2, an example optical interposer 200 for optical communication systems is illustrated. The optical interposer 200 may, for example, be provided in the cable connector 102 of the networking cable 100 shown in FIG. 1.

As shown, the optical interposer 200 may include a substrate 201 that supports a plurality of optical components as described hereafter. The substrate 201 may be formed of an optically-transparent material with embedded optical waveguides, as described hereafter, such that optical signals may be transmitted therethrough. By way of example, the substrate 201 may be formed of glass, silicon, or any other material suitable to transmit optical signals. The substrate 201 may be formed so as to define a first end 202 and a second end 204. While illustrated herein as a substrate configured as a rectangular prism in which the first end 202 is opposite the second end 204, the present disclosure contemplates that the substrate 201 may be dimensioned (e.g., sized and shaped) for any application. In some embodiments, the substrate 201 may be formed, for example, as a glass substrate with embedded glass or silicon nitride waveguides or as a silicon on insulator (SOI) substrate with silicon waveguides (e.g., silicon photonics) or silicon nitride waveguides.

With continued reference to FIG. 2, the first end 202 of the substrate 201 may be configured to receive a first optical fiber welded thereto (e.g., as shown in FIGS. 3-6). As described above, traditional communication components rely upon adhesives to secure optical fibers or other optical signal sources to corresponding waveguides. In this way, the number of waveguides and/or circuitry elements in optical communication with the optical fibers, cables or optical signal sources is limited. As described hereafter, however, the optical interposer 200 of the present application may define a network of optical waveguides and redistribution elements such that a single welded optical fiber may supply a plurality of connected circuitry elements. In this way, welded optical fibers of the present application provide an increased tolerance to high optical power (e.g., as compared to adhesives) as well as an increased compatibility with reflowing assembly methods (e.g., that require increased heat). The welded optical fibers further operate to reduce fiber assembly alignment tolerances as compared to conventional adhesives. By way of example, conventional adhesives are used to glue a fiber in position with respect to an optical waveguide. During curing of the adhesive, however, the adhesive may expand or shrink such that slight misalignments are induced resulting in increased nominal loss and/or loss variation between adjacent channels (e.g., lanes). These misalignments and associated losses are not present in the welded optical fiber solutions described herein.

Figure 3:
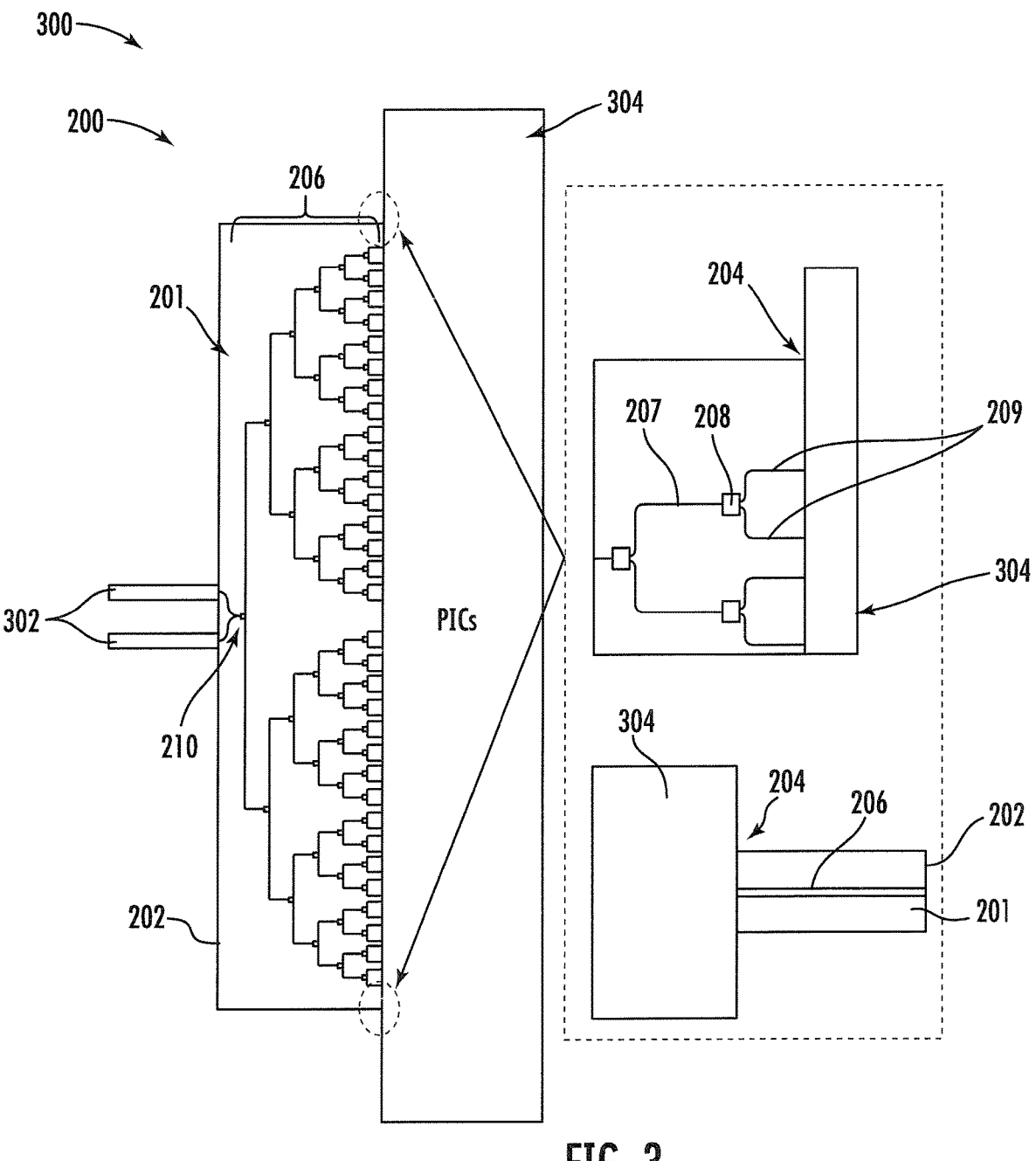
FIG. 3 is a top view of an example optical communication system including the optical interposer of FIG. 2 according to an example embodiment.
Figure 4:
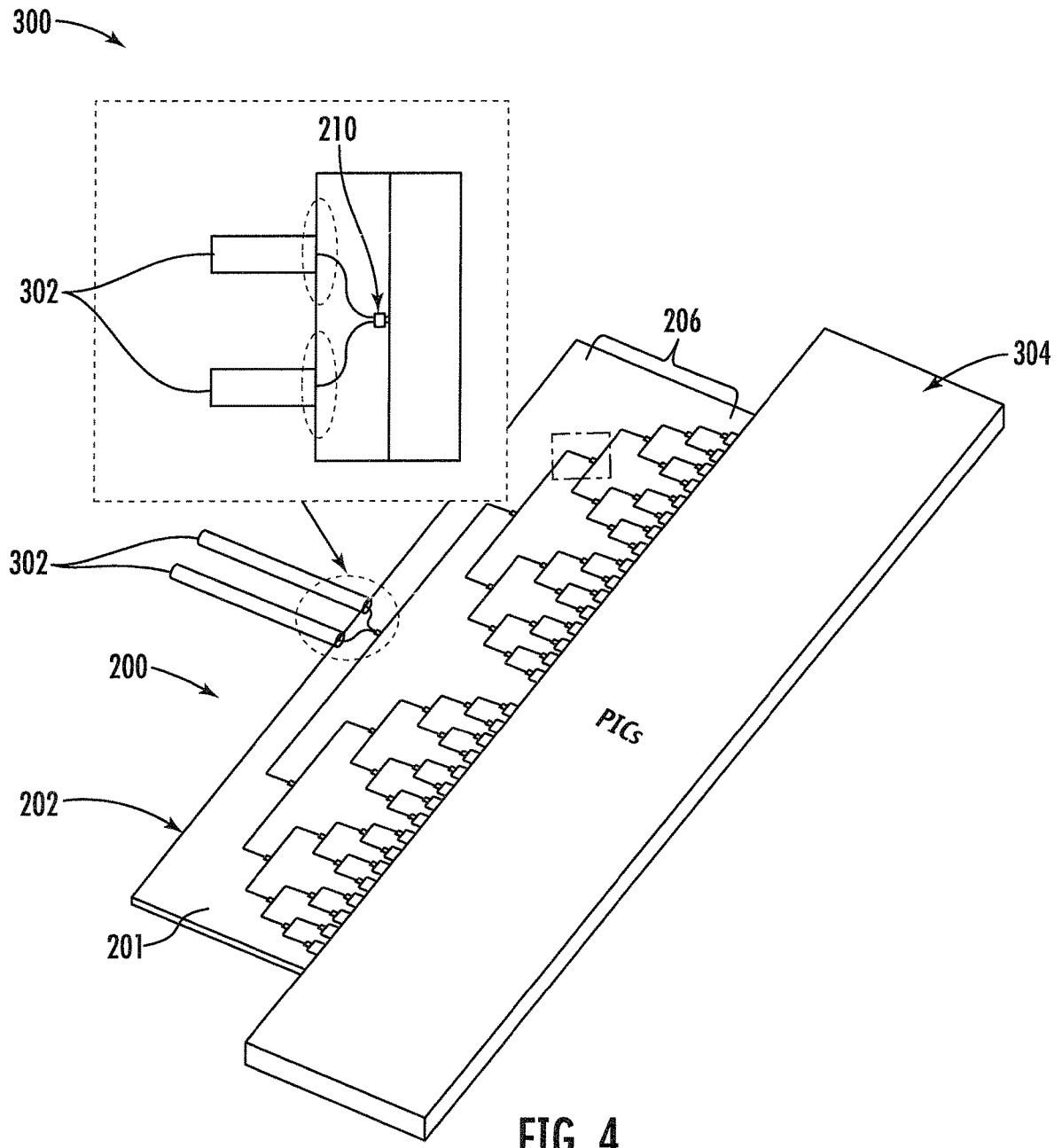
FIG. 4 is a perspective view of the optical communication system of FIG. 3 according to an example embodiment.

As described hereafter with reference to FIGS. 3-4, the first optical fiber may be attached to the substrate 201 at the first end 202 in an in-plane configuration. In other embodiments, as described hereafter with reference to FIGS. 5-6, the first welded optical fiber may be attached to the substrate 201 and the first end 202 in a vertical configuration. The present disclosure contemplates that the first optical fiber may be welded to the first end 202 of the substrate 201 by fusion splicing or any equivalent welding technique applicable to optical communication components.

The second end 204 of the substrate 201 may be configured to receive a plurality of PICs attached thereto (e.g., as shown in FIGS. 3-6). As would be evident to one of ordinary skill in the art in light of the present disclosure, the PICs may refer to any optical medium configured to receive optical signals. Said differently, the present disclosure contemplates that other circuitry may be employed by the optical communication systems described herein based upon the intended application. As described hereafter with reference to FIGS. 3-4, the plurality of PICs may be attached to the substrate 201 at the second end 204 in an in-plane configuration. In other embodiments as described hereafter with reference to FIGS. 5-6, the plurality of PICs may be attached to the substrate 201 and the first end 204 in a vertical configuration. While illustrated herein as a single PIC for the sake of clarity (e.g., PIC 304 and PIC 504), the present disclosure contemplates that any number of PICs may be attached to the substrate 201 at the second end 204. The present disclosure further contemplates that the PICs may be attached to the substrate 201 via any attachment technique (e.g., welding, using optical couplers, etc.).

With continued reference to FIG. 2, the optical interposer 200 may include an optical waveguide network 206 defined by the substrate 201. In an operational configuration as shown in FIGS. 3-6, in which the first end 202 receives the first welded optical fiber and the second end 204 receives the plurality of PICs, the optical waveguide network 206 may be configured to provide optical communication between the first welded optical fiber and the plurality of PICs. As would be evident to one of ordinary skill in the art in light of the present disclosure, the optical waveguide network 206 may include a plurality of interconnected elements configured to allow optical signals to pass therethrough. As shown in FIG. 2, the optical waveguide network 206 of the present application may be configured in a cascading configuration. In this way, the optical waveguide network 206 (e.g., via the redistribution elements 208 described hereafter) may separate, split, or otherwise distribute the single, high-powered optical signal received via the first end 202 into a plurality of output optical signals for transmission via the second end 204. While described herein with reference to a cascading configuration, the present disclosure contemplates that the optical waveguide network 206 may include any number of waveguides in any configuration, arrangement, or orientation based upon the intended application of the optical interposer 200.

The optical interposer 200 may include a plurality of optical redistribution elements 208 supported by the substrate 201 and disposed within the optical waveguide network 206. In an operational configuration as shown in FIGS. 3-6, in which the first end 202 of the substrate 201 receives the first optical fiber (e.g., welded optical fibers 302 in FIGS. 3-4) and the second end 204 of the substrate 201 receives the plurality of PICs (e.g., plurality of PICs 304 in FIGS. 3-4), the plurality of optical redistribution elements 208 may be configured to successively split a first input optical signal received by the first welded optical fiber such that a plurality of output optical signals are directed to the plurality of PICs. The plurality of optical redistribution elements 208 may include power splitting structures, Y-junctions, directional optical couplers, multi-mode interference couplers, or any other optical element configured to receive an optical signal input and output two (2) or more optical signal outputs. While described herein with reference to distinct optical redistribution elements 208 within the optical waveguide network 206, the present disclosure contemplates that, in some embodiments, the optical waveguide network 206 may form the optical redistribution elements 208.

With continued reference to FIG. 2, the optical redistribution elements 208 may, in some embodiments, each be configured to receive a single optical signal input 207 and output two (2) optical signal outputs 209. As would be evident to one of ordinary skill in the art in light of the present disclosure, the optical signal outputs 209 may in some embodiments operate as optical signal inputs 207 for subsequent optical redistribution elements 208 in the optical waveguide network 206. By way of example, the optical interposer 200 may receive a first welded optical fiber transmitting a high-powered optical signal of 40 mW (e.g., as the first input optical signal). The optical waveguide network 206 may receive this first optical input signal and direct the signal to at least one optical redistribution element 208. In this example, the optical redistribution element 208 may receive the optical signal (e.g., signal 207) and split the optical signal into two (2) optical signal outputs (e.g., output signals 209) of 20 mW each. Each of the 20 mW output signals (e.g., output signals 209) may be directed by the optical waveguide network 206 to subsequent optical redistribution elements 208 in a cascading configuration such that each of the 20 mW output signals operates as an input signal (e.g., input signal 207) for a subsequent optical redistribution element 208. As such, the subsequent optical redistribution element 208 may split the 20 mW input signal (e.g., input signal 207) into two (2) optical signal outputs (e.g., signals 209) of 10 mW each.

In this way, the optical redistribution elements 208 may be configured to successively split the first optical signal input from the first welded optical fiber into a plurality of output signals for direction to the plurality of PICs. While described herein with reference to the optical redistribution elements 208 splitting a single signal input into two (2) output signals of equal power, the present disclosure contemplates that each optical redistribution element 208 may split the respective optical input signal into any number of output signals based upon the intended application. Similarly, each optical redistribution element 208 may also operate to split the optical input signal into output signals having unequal power, bandwidth, or the like.

With reference to FIGS. 3-4, an example optical communication system 300 is illustrated with the optical interposer 200 of FIG. 2 in an operational configuration in which the first end 202 of the substrate 201 receives optical fibers 302 welded thereto (e.g., a first optical fiber and a second optical fiber) and the second end 204 of the substrate 201 receives a plurality of PICs 304 attached thereto. As described above, the plurality of PICs is illustrated herein as a single PIC for brevity and clarity of description. As shown in FIGS. 3-4, in some embodiments, the first end 202 and the second end 204 may receive the welded optical fibers 302 and the PICs 304, respectively, in an in-plane configuration. As would be evident to one of ordinary skill in the art in light of the present disclosure, an in-plane configuration may refer to an arrangement in which the optical fibers 302 and/or the PICs 304 are attached to the substrate 201 in a plane defined by the substrate 201 (e.g., aligned in the same plane). Said differently, in an in-plane configuration the optical fibers 302 and/or the PICs 304 may be aligned with the substrate 201 such that the direction of the optical signals transmitted into the substrate 201 at the first end 202 and out of the substrate 201 at the second end 204 is unchanged (e.g., additional mirrors or other redirecting elements are unnecessary).

In the in-plane configuration, the optical fibers 302 may be directly butt-coupled to the optical interposer 200 and/or the optical fibers 302 may be attached to the optical interposer 200 via one or more alignment structures (not shown) such as V-grooves. The optical communication system 300 may operate substantially the same as described above with reference to FIG. 2 in which the welded optical fibers 302 (e.g., at least a first welded optical fiber) may transmit high-powered optical signal(s) to the optical interposer 200. The optical interposer 200 may, via the optical waveguide network 206 and optical redistribution elements 208 defined therein, transmit and successively split the high-powered optical signal(s) such that a plurality of output optical signals is directed to the plurality of PICs 304 attached to the optical interposer 200 at the second end 204.

In some embodiments, the optical interposer 200 may define a directional coupler 210 at the first end 202 of the substrate 201 such that the optical interposer 200 may offer redundancy against failures of an external optical signal generator (e.g., failure of the first welded optical fiber). In such an embodiment, an optical communication system 300 may be provided that receives two (2) welded optical fibers 302 as shown in FIGS. 3-6. The directional coupler 210 may receive two high-powered optical signal inputs and may direct one or more of the high-powered optical signals to the optical waveguide network 206. Said differently, the directional coupler 210 may operate to, in an instance in which one of the two (2) welded optical fibers 302 fails, power the other of the two (2) welded optical fibers 302 for redistribution by the optical waveguide network 206 and optical redistribution elements 208. In this way, the redundancy offered by the two (2) welded optical fibers allows for a transceiver to remain operational without maintenance. Such a configuration is particularly useful for multi-chip module (MCM) systems where maintenance is challenging and cost intensive.

Figure 5:
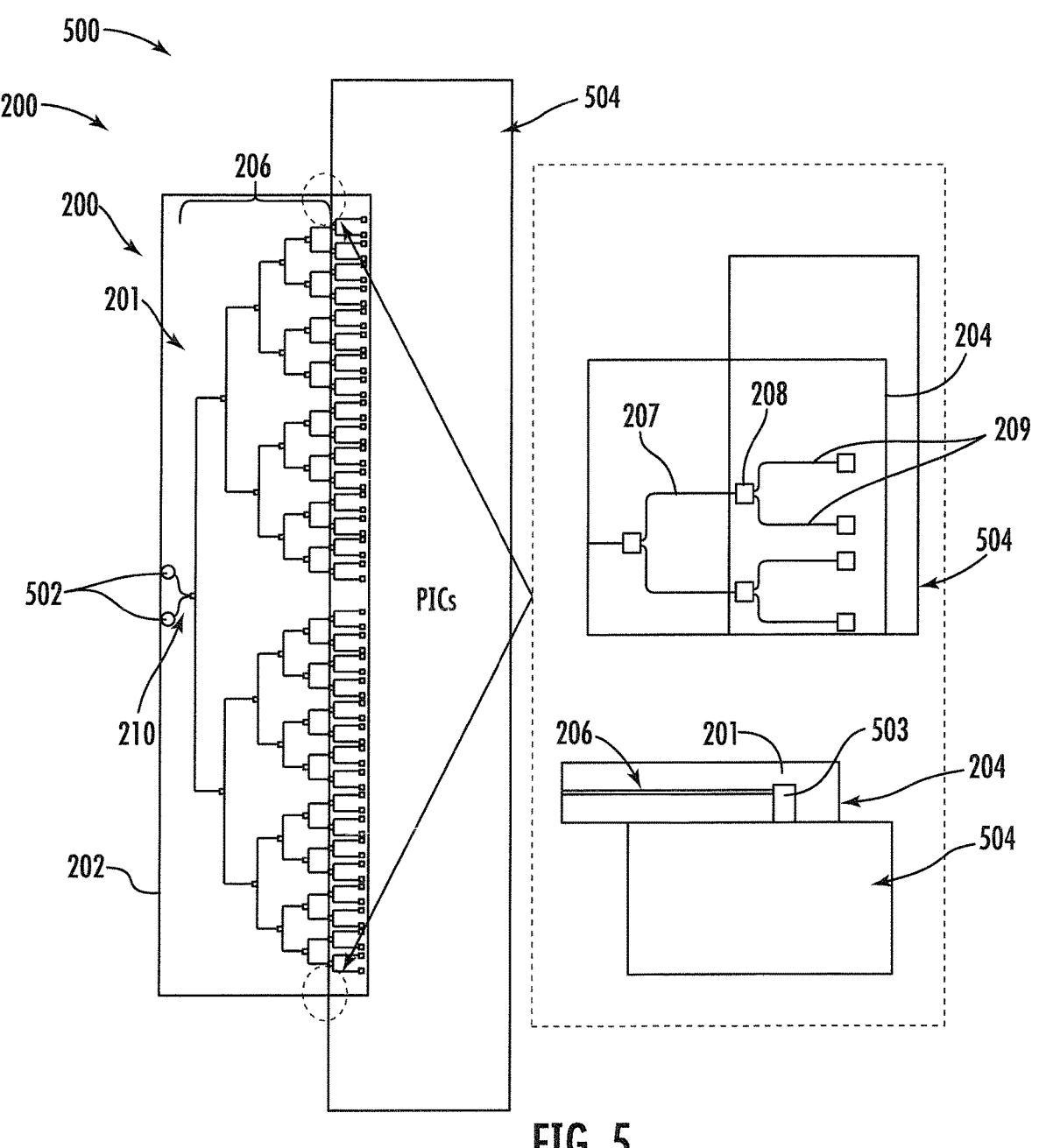
FIG. 5 is a top view of an alternative example optical communication system including the optical interposer of FIG. 2 according to an example embodiment.
Figure 6:
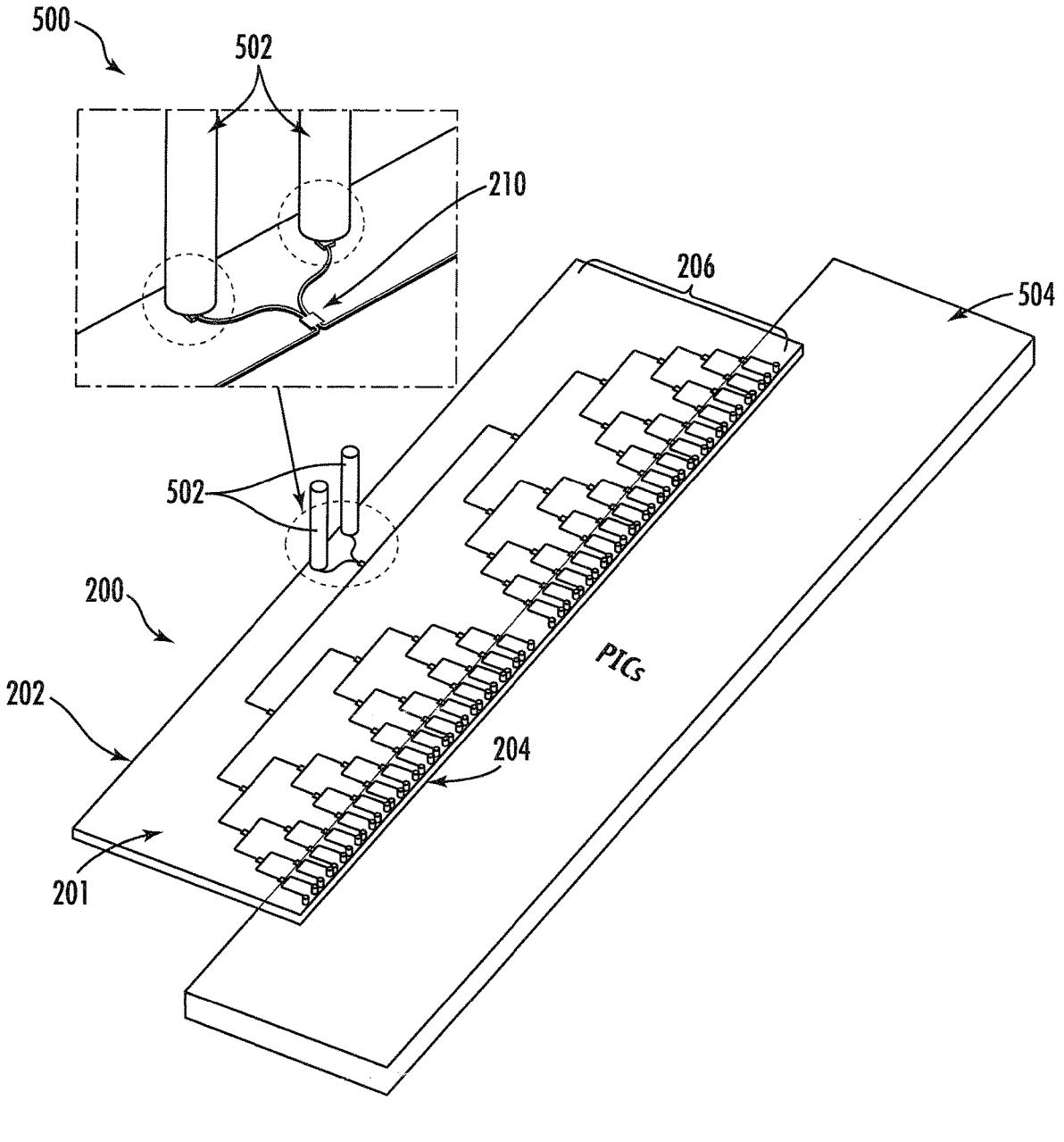
FIG. 6 is a perspective view of the optical communication system of FIG. 5 according to an example embodiment.

With reference to FIGS. 5-6, an example optical communication system 500 is illustrated with the optical interposer 200 of FIG. 2 in an operational configuration in which the first end 202 of the substrate 201 receives optical fibers 502 welded thereto (e.g., a first optical fiber and a second optical fiber) and the second end 204 of the substrate 201 receives a plurality of PICs 504 attached thereto. As shown in FIGS. 5-6, in some embodiments, the first end 202 and the second end 204 may receive the welded optical fibers 502 and the PICs 304, respectively, in a vertical configuration. In the vertical configuration, the optical fibers 502 may be attached to the first end 202 such that the optical fibers 502 may be positioned substantially perpendicular with respect to the substrate 201. In the vertical configuration, the PICs 504 may overlap with the optical interposer 200 such that alignment structures 503 may be used to provide optical communication between the optical interposer 200 and the PICs 504. The PICs 504 may overlap with either a top surface or a bottom surface of the optical interposer 200 and, in some embodiments, may provide additional electrical functionality (e.g., contact pads, electrical redistribution layers, electrical through vias, or the like) such that the PIC 504 and optical interposer 200 may be bonded on, for example, a printed circuit board (PCB).

As would be evident to one of ordinary skill in the art in light of the present disclosure, a vertical configuration may refer to an arrangement in which the optical fibers 502 and/or the PICs 504 are attached to the substrate 201 such that the direction of the optical signal transmitted into the substrate 201 at the first end 202 and out of the substrate 201 at the second end 204 changes. In the vertical configuration, the alignment structures 503 may define a suitable mirror or curved waveguide in the optical interposer 200 that is configured to direct (e.g., steer) the optical signals (e.g., the direction of light propagation) towards the same plane as the optical waveguides (not shown) in the PICs 504. The optical communication system 500 may operate substantially the same as described above with reference to FIGS. 2-4 in which the welded optical fibers 502 (e.g., at least a first welded optical fiber) may transmit high-powered optical signal(s) to the optical interposer 200. The optical interposer 200 may, via the optical waveguide network 206 and optical redistribution elements 208 defined therein, transmit and successively split the high-powered optical signal(s) such that a plurality of output optical signals is directed to the plurality of PICs 504 attached to the optical interposer 200 at the second end 204.

In some embodiments, the optical interposer 200 may be configured for operation with one or more multiplexed optical signals. By way of example, in some instances the high-powered optical signal source may include a wavelength-division-multiplexing laser source such that the first optical signal input (e.g., via the welded optical fibers 302 or 502) may include a multi-wavelength optical signal (e.g., a wavelength comb). In such an embodiment, the substrate 201 may further define one or more demultiplexing structures (not shown) configured to separate the multiplexed optical signal. In some embodiments, the wavelength demultiplexing structures (not shown) may include one or more arrayed waveguide gratings configured to distribute output optical signals having different wavelengths or sets of wavelengths to the PICs 304, 504. In other embodiments, the PICs may have on-chip wavelength-sensitive structures (not shown) such as rings, ring modulators, or the like configured to facilitate demultiplexing the wavelength multiplexed optical signals.

In another embodiment, the high-power laser's wavelength (e.g., provided by the welded optical fibers 302, 502) may be selected in such a way as to generate optical amplification in the optical interposer 200. In such an embodiment, the optical interposer 200 may include one or more gain input elements that define waveguides applicable for use with on-board laser cavities or optical amplifiers. For example, the waveguides (e.g., at least a portion of the optical waveguide network 206) may be doped with a rare-earth element (e.g., erbium or the like) such that optical gain is provided to the optical signal received in these doped waveguides in an instance in which the optical signals are at an appropriate wavelength (e.g., 980 nm or 1480 nm). In an instance in which the waveguides are doped with a rare-earth element, the high-powered laser welded to the optical interposer 200 may transmit two wavelengths, one for amplification and one to feed the rare-earth elements. In some instances, the optical interposer 200 may also include an on-board laser cavity (e.g., a rare-earth doped section inside an optical cavity, a distributed feedback laser (DFB), a distributed Bragg reflector laser, or a ring resonator). In some alternative embodiments, the optical interposer 200 may include an electrically-pumped gain medium (i.e., instead of a rare-earth-element doped region) that may be monolithically or hybridly integrated on the interposer.

In other embodiments, the optical waveguide network 206 may include non-linear waveguides (e.g., created from chalcogenide glass or the like) that are configured to generate optical gain in a broadband spectral region when supplied with optical signals at an appropriate wavelength. In such an embodiment the high-power laser at an example wavelength $k_p$ supplies the gain input elements (not shown) of the optical interposer 200 so as to provide on-board light generation (e.g., when the gain section is placed in an optical cavity) and/or amplification (e.g., when the gain section is placed in an optical amplifier design) at a different wavelength region.

In this way, the embodiments of the present application utilize emerging optical interposer configurations that leverage high-powered optical fibers attached via welded connections in order to couple a single high-power laser source (e.g., optical signal generator) with the same optical interposer. Furthermore, the optical interposers of the present application provide for efficient optical signal redistribution from a signal optical signal source to a plurality of attached circuits (photonic integrated circuits (PICs)).

Example Method of Manufacturing

Figure 7:
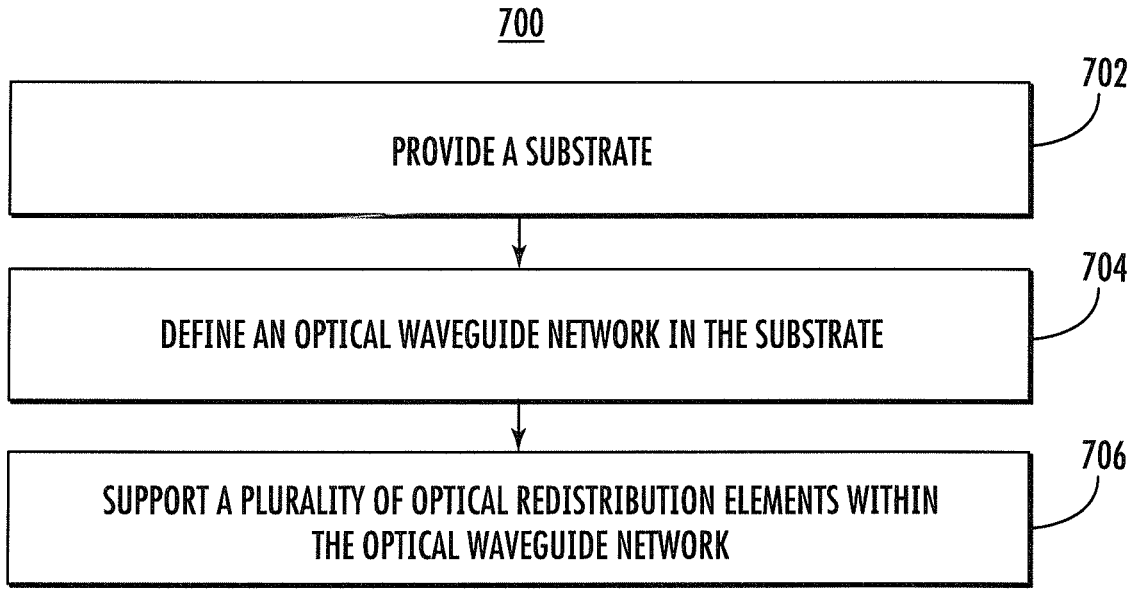
FIG. 7 is a method for manufacturing an optical interposer according to an example embodiment.

With reference to FIG. 7, a method for manufacturing an optical interposer according to embodiments of the invention is illustrated. The method 700 may include providing a substrate at Block 702. As described above, the substrate may be configured to support a plurality of optical components and/or may be formed of an optically-transparent material with embedded optical waveguides such that optical signals may be transmitted therethrough. In some embodiments, the substrate may be formed of glass, silicon, or any other material suitable to transmit optical signals. The substrate may further define a first end that is configured to receive a first optical fiber welded thereto. In some embodiments, the first optical fiber may be attached to the substrate at the first end in an in-plane configuration. In other embodiments, the first welded optical fiber may be attached to the substrate and the first end in a vertical configuration. The substrate provided at Block 702 may further define a second end that may be configured to receive a plurality of PICs attached thereto. The PICs attached at the second end may refer to any optical medium configured to receive optical signals. In some instances, the plurality of PICs may be attached to the substrate at the second end in an in-plane configuration. In other embodiments, the plurality of PICs may be attached to the substrate and the first end 204 in a vertical configuration.

The method may further include defining an optical waveguide network in the substrate at Block 704. As described above, the optical waveguide network may be configured to provide optical communication between the first welded optical fiber and the plurality of PICs attached to the substrate provided at Block 702. As would be evident to one of ordinary skill in the art in light of the present disclosure, the optical waveguide network may include a plurality of interconnected elements configured to allow optical signals to pass therethrough. In some embodiments, the optical waveguide network may be configured in a cascading configuration. In this way, the optical waveguide network (e.g., via the redistribution elements described herein) may separate, split, or otherwise distribute the single, high-powered optical signal received via the first end into a plurality of output optical signals for transmission via the second end. While described herein with reference to a cascading configuration, the present disclosure contemplates that the optical waveguide network may include any number of waveguides in any configuration or orientation based upon the intended application of the optical interposer 200.

The method may further include supporting a plurality of optical redistribution elements within the optical waveguide network at Block 706. As described above, in an instance in which the first end of the substrate receives the first optical fiber and the second end 204 of the substrate receives the plurality of PICs, the plurality of optical redistribution elements may be configured to successively split a first input optical signal received by the first welded optical fiber such that a plurality of output optical signals is directed to the plurality of PICs. The plurality of optical redistribution elements may include power splitting structures, Y-junctions, directional optical couplers, multi-mode interference couplers, or any other optical element configured to receive an optical signal input and output two (2) or more optical signal outputs. While described herein with reference to distinct optical redistribution elements within the optical waveguide network, the present disclosure contemplates that, in some embodiments, the optical waveguide network may form the optical redistribution elements.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optical interposer comprising:
   a substrate defining:
      a first end configured to receive a first optical fiber welded thereto, and
      a second end configured to receive a plurality of photonic integrated circuits (PICs) attached thereto;
   an optical waveguide network defined by the substrate and configured to, in an operational configuration in which the first end receives the first welded optical fiber and the second end receives the plurality of PICs, provide optical communication between the first welded optical fiber and the plurality of PICs; and
   a plurality of optical redistribution elements supported by the substrate and disposed within the optical waveguide network,
   wherein, in the operational configuration, the optical interposer is configured to receive a first input optical signal from the first welded optical fiber, and the plurality of optical redistribution elements is configured to selectively and successively split the first input optical signal such that a plurality of output optical signals is directed to the plurality of PICs.

2. The optical interposer according to claim 1, wherein the first end is configured to receive the first welded optical fiber in an in-plane configuration.

3. The optical interposer according to claim 1, wherein the first end is configured to receive the first welded optical fiber welded to a top surface of the first end, such that the first welded optical fiber is positioned substantially perpendicular with respect to the substrate.

4. The optical interposer according to claim 1, where the first end of the substrate is further configured to receive a second optical fiber welded thereto.

5. The optical interposer according to claim 4, wherein the optical waveguide network further comprises a directional coupler configured to receive the first optical input signal from the first welded optical fiber and a second optical input signal from the second welded optical fiber.

6. The optical interposer according to claim 1, wherein the substrate further defines one or more demultiplexing structures configured to, in an instance in which the first input optical signal comprises a multiplexed optical signal, demultiplex the multiplexed optical signal.

7. The optical interposer according to claim 1, wherein the optical waveguide network further comprises one or more gain input elements configured to provide optical gain to the plurality of output optical signals.

8. An optical communication system comprising:
a first optical fiber;
a plurality of photonic integrated circuits; and
an optical interposer comprising:
 a substrate defining:
  a first end configured to receive the first optical fiber welded thereto, and
  a second end configured to receive the plurality of photonic integrated circuits (PICs) attached thereto;
 an optical waveguide network defined by the substrate and configured to provide optical communication between the first welded optical fiber and the plurality of PICS; and
 a plurality of optical redistribution elements supported by the substrate and disposed within the optical waveguide network,
 wherein the optical interposer is configured to receive a first input optical signal from the first welded optical fiber, and the plurality of optical redistribution elements is configured to selectively and successively split the first input optical signal such that a plurality of output optical signals is directed to the plurality of PICs.

9. The optical communication system according to claim 8, wherein the first optical fiber is welded to the first end of the substrate in an in-plane configuration.

10. The optical communication system according to claim 8, wherein the first optical fiber is welded to the first end of the substrate in a vertical configuration such that the first welded optical fiber is positioned substantially perpendicular with respect to the substrate.

11. The optical communication system according to claim 8, further comprising a second optical fiber welded to the first end of the substrate.

12. The optical communication system according to claim 11, wherein the optical waveguide network further comprises a directional coupler configured to receive the first optical input signal from the first welded optical fiber and a second optical input signal from the second welded optical fiber.

13. The optical communication system according to claim 8, wherein the substrate further defines one or more demultiplexing structures configured to, in an instance in which the first input optical signal comprises a multiplexed optical signal, demultiplex the multiplexed optical signal.

14. The optical communication system according to claim 8, wherein the optical waveguide network further comprises one or more gain input elements configured to provide optical gain to the plurality of output optical signals.

15. The optical interposer according to claim 1, wherein at least a portion of the second end of the interposer is configured to overlap at least a portion of the plurality of PICs.

16. The optical interposer according to claim 1, wherein a bottom surface of the substrate opposite the top surface at the second end is configured to overlap at least a portion of the plurality of PICs.

17. The optical interposer according to claim 15, further comprising a plurality of alignment structures configured to provide optical communication between the optical waveguide network at the second end and the plurality of PICs.

18. The optical interposer according to claim 1, wherein the first end of the substrate is further configured to receive a second welded optical fiber welded to the top surface of the first end of the substrate such that the first welded optical fiber is positioned substantially perpendicular with respect to the substrate.

19. The optical interposer according to claim 18, wherein the optical interposer is configured to receive a second input optical signal from the second welded optical fiber in an instance in which the first welded optical fiber fails.

20. The optical interposer according to claim 1, wherein a bandwidth for at least one of the plurality of output optical signals from the plurality of optical redistribution elements differs from a bandwidth of another of the plurality of output optical signals.

21. The optical interposer according to claim 1, wherein the plurality of optical redistribution comprises power splitting structures.

22. The optical interposer according to claim 1, wherein the plurality of optical redistribution elements directional optical couplers.

23. The optical interposer according to claim 1, wherein the plurality of optical redistribution elements comprises multi-mode interference couplers.

* * * * *